R. McLENNAN.
CLEAT FOR ELECTRIC WIRING.
APPLICATION FILED FEB. 18, 1908.

911,429.

Patented Feb. 2, 1909.

WITNESSES
William P. Goebel
C. W. Fairbank

INVENTOR
Roderick McLennan
BY Munn & Co
ATTORNEYS

UNITED STATES PATENT OFFICE.

RODERICK McLENNAN, OF BALLSTON SPA, NEW YORK.

CLEAT FOR ELECTRIC WIRING.

No. 911,429.　　　Specification of Letters Patent.　　　Patented Feb. 2, 1909.

Application filed February 18, 1908. Serial No. 416,460.

*To all whom it may concern:*

Be it known that I, RODERICK McLENNAN, a citizen of the United States, and a resident of Ballston Spa, in the county of Saratoga and State of New York, have invented a new and Improved Cleat for Electric Wiring, of which the following is a full, clear, and exact description.

This invention relates to certain improvements in cleats for electric wiring, and more particularly to cleats for securing a plurality of substantially parallel wires to a wall or ceiling at a bend or turn in the wires, as, for instance, at a corner of the room.

As is well known, if an insulated electric wire is bent at a sharp angle there is a liability of breaking or weakening the insulation, and also if the wire is repeatedly bent at a sharp angle at the same point, the wire may be very readily broken.

The object of my invention is to provide a cleat for use at a bend or angle in the wires, for limiting or controlling the positions of the wires and preventing the latter from being bent at sharp angles.

A further object is to provide a simple form of cleat to take the place of the two cleats commonly employed and reduce the work required in securing the wires in place.

Reference is to be had to the accompanying drawings, forming a part of this specification, in which similar characters of reference indicate corresponding parts in both the figures, and in which—

Figure 1:
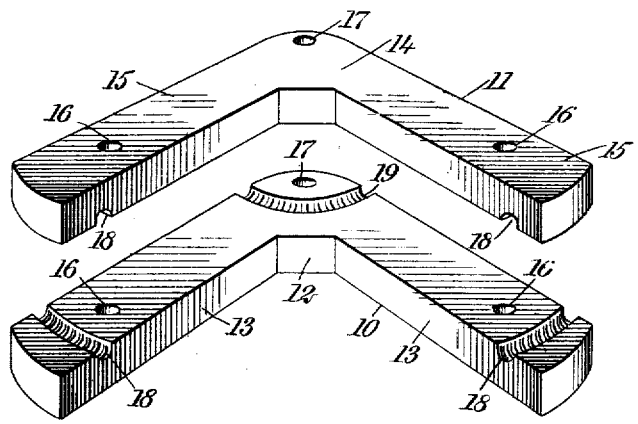
Figure 2:
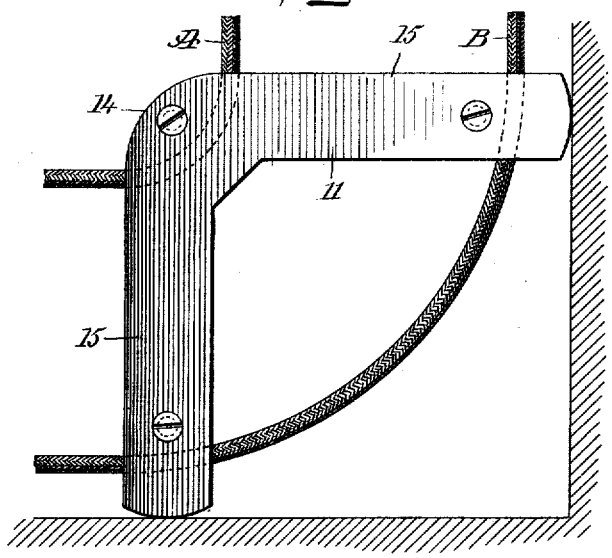

Figure 1 is a perspective view of the two members going to make up my improved cleat; and Fig. 2 is a plan view of the cleat showing the position of the wires in respect thereto.

My improved cleat is made up of two members, one, a base member 10, and the other, a cap or cover member 11, the two being somewhat similar in construction. The base member 10 has a central portion 12 and two divergent arms or branches 13 extending outwardly therefrom in the same plane but at an angle to each other. The cap or cover 11 is very similar to the base member and is provided with a central or body portion 14 and two divergent branches or arms 15. The cleat is provided with a plurality of screw holes extending through both members for securing the members together and securing the cleat to the wall or ceiling. There is preferably provided a screw hole 16 adjacent the outer end of each of the arms or branches, and a third screw hole 17 in the body portion at the intersection of the arms or branches.

For holding the wires, the meeting faces of the two members are provided with grooves 18, extending transversely of the arms or branches adjacent their outer ends, the grooves in the two arms of each member preferably lying in the arc of the same circle, the center of which is adjacent the central body portion which connects together the two arms or branches at their intersection. A third groove 19 is provided in the body portion, and this groove preferably lies in the arc of a circle concentric with the circle above referred to. If the cleat is designed for use in securing more than two wires in position, additional grooves may be provided in the engaging faces of the members and concentric with the grooves above referred to. The grooves are preferably provided with corrugations, as shown, in order that a firm hold may be had upon the wires.

In using my improved cleat, the members are assembled with the wires disposed in the grooves, and the two members are secured together and to the wall or ceiling by suitable screws entering through screw-holes, as indicated in Fig. 2. The inner wire A, that is, the one turning at the shortest angle, is held within the groove 19, which latter insures the bending of the wire in a particular curve and positively prevents its being bent at a sharp angle. The grooves 18 receive the outer wire B, and the curvature of these grooves causes the wire to assume a position along a curve substantially concentric with the curve of the groove 19. This also prevents the wire from bending at a sharp angle.

Heretofore it has been customary to employ two cleats corresponding in some respects to the two arms or branches of my improved cleat, but these two cleats had to be placed in position separately; a greater number of screws or other fastening means had to be employed, and the wire was often bent at a sharp angle between the cleats, so as to injure the insulation or weaken the wire.

I desire it to be understood that the grooves in the base member 10 may be located either inward or outward of the screw holes, as may be deemed desirable in practice.

Having thus described my invention, I claim as new and desire to secure by Letters Patent:

1. A cleat for securing in position an electric wire adjacent a bend or curve in the latter, comprising a base and a cap disposed in planes parallel to the plane of the wire, and each having two branches or arms extending at an angle to each other, the engaging faces of said base and cap having oppositely-disposed grooves for the reception of the wire.

2. A cleat for securing in position electric wires adjacent bends or curves in the latter, comprising a base and a cap disposed in planes parallel to the planes of the wires and each having two branches or arms extending at an angle to each other and adapted to hold the wires therebetween, said wires being held in oppositely-disposed grooves in the engaging faces of said face and cap and adjacent the bends or curves in the wires, said grooves being disposed in arcs of concentric circles.

In testimony whereof I have signed my name to this specification in the presence of two subscribing witnesses.

RODERICK McLENNAN.

Witnesses:
MARGARET A. CONIFF,
WILLIAM H. SHERMAN.